Figure 1:
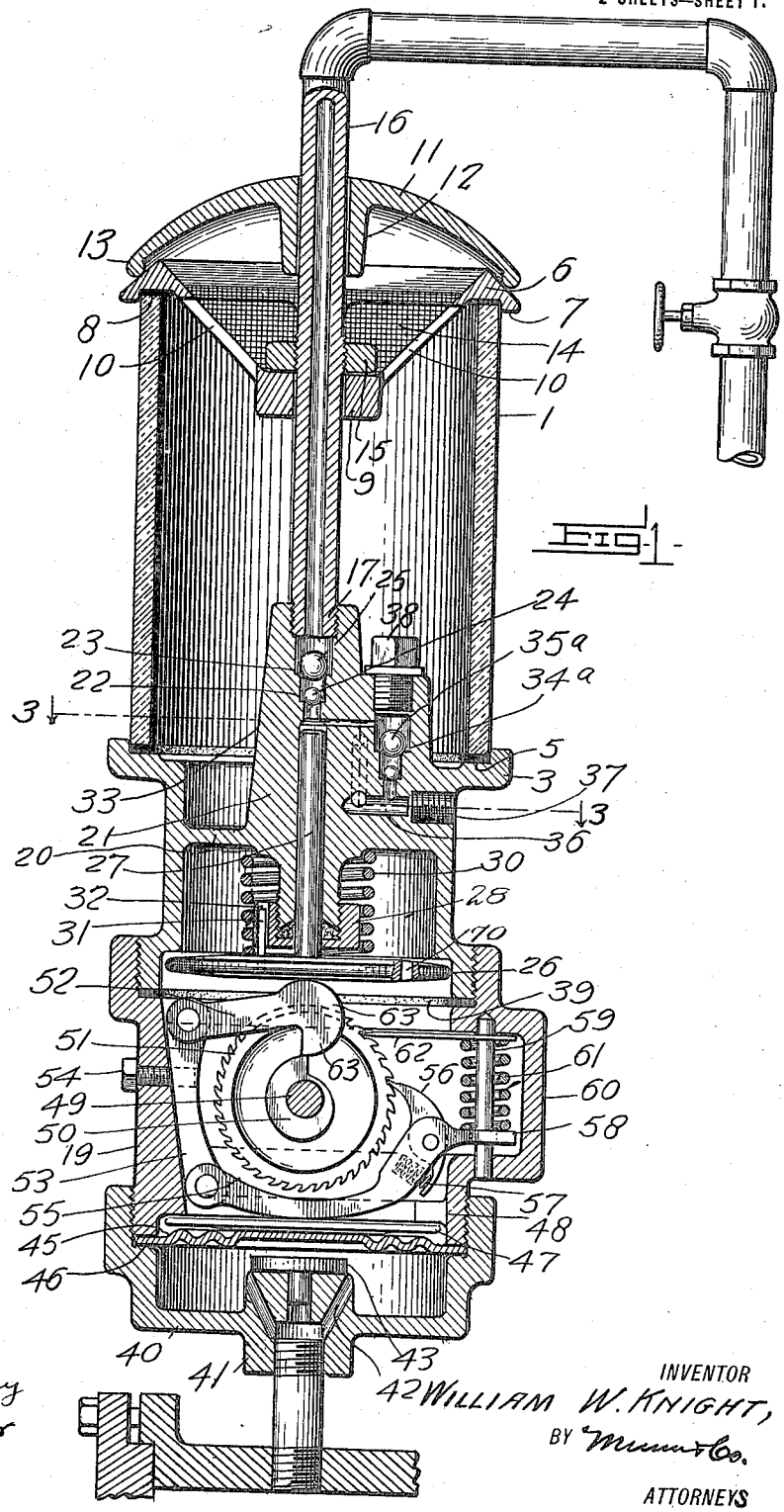

W. W. KNIGHT.
LUBRICATOR.
APPLICATION FILED JUNE 19, 1914.

1,145,689.

Patented July 6, 1915.
2 SHEETS—SHEET 1.

WITNESSES
F. C. Barry
C. E. Trainor

INVENTOR
WILLIAM W. KNIGHT,
BY Munn & Co.
ATTORNEYS

W. W. KNIGHT.
LUBRICATOR.
APPLICATION FILED JUNE 19, 1914.
1,145,689.
Patented July 6, 1915.
2 SHEETS—SHEET 2.
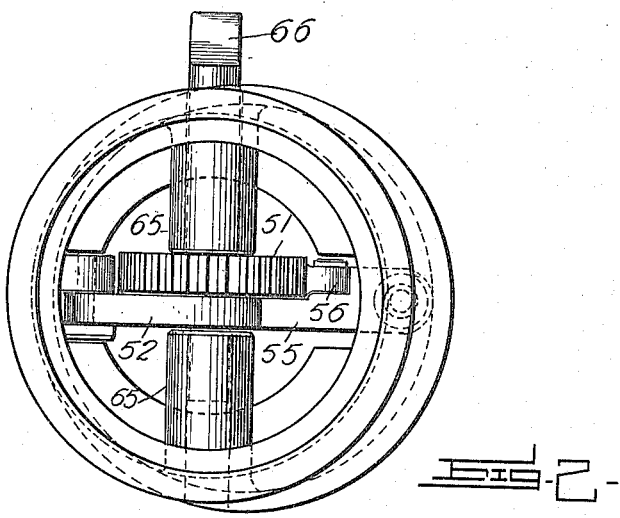
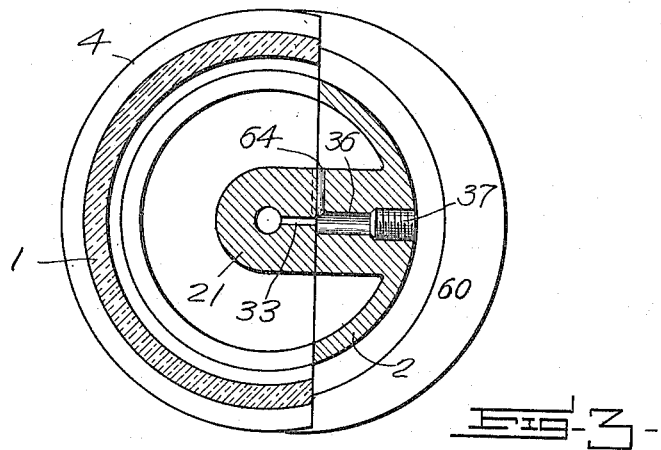
WITNESSES
INVENTOR
WILLIAM W. KNIGHT,
BY
ATTORNEYS

UNITED STATES PATENT OFFICE.

WILLIAM WALTER KNIGHT, OF BIRMINGHAM, ALABAMA, ASSIGNOR OF ONE-FOURTH TO PERRY H. WILLIAMS, OF MEMPHIS, TENNESSEE.

LUBRICATOR.

1,145,689.  Specification of Letters Patent.  Patented July 6, 1915.

Application filed June 19, 1914. Serial No. 846,089.

*To all whom it may concern:*

Be it known that I, WILLIAM W. KNIGHT, a citizen of the United States, and a resident of Birmingham, in the county of Jefferson and State of Alabama, have invented a new and useful Improvement in Lubricators, of which the following is a specification.

My invention is an improvement in lubricators, and has for its object to provide a lubricator adapted for positively feeding lubricant from a suitable container to a surface to be lubricated, and designed for connection with the cylinder of an engine, either steam or liquid fuel, and wherein the feeding mechanism is arranged to be operated by the variations in pressure in the said cylinder.

In the drawings: Figure 1 is a vertical section through the improved lubricator, Fig. 2 is a top plan view with the upper portion of the casing removed, and showing the operating mechanism, and Fig. 3 is a section on the line 3—3 of Fig. 1, looking in the direction of the arrows adjacent to the line.

The present embodiment of the invention comprises a container consisting of a cylindrical body 1 of glass or the like, and connected at its lower end to a substantially cylindrical casing 2, having at its upper end a radial flange 3, upon whose upper face the body 1 seats. The flange has an annular upstanding rib 4 at its margin, fitting outside of the body, and a packing ring or gasket 5 is arranged between the lower end of the body and the upper face of the flange inside the rib 4.

The upper end of the body engages the under face of a ring 6, of approximately triangular cross section and having a marginal rib 7 on its under face which fits outside the body. The upper end of the body engages a packing ring or gasket 8, which is seated between the ring and the body, and a bearing ring 9 is supported below the ring, and within the body, the said ring being connected to the bearing ring by arms 10. The bearing ring and the arms constitute a spider, and a concavo-convex head 11 is seated on the ring. The head has a central opening and a nipple 12, extending inwardly around the opening, and the nipple 12 is in register with the bearing ring 9. The free edge of the head 11 is ribbed or beaded as shown at 13, and the rib or bead rests against the outer inclined face of the ring 6.

A screen 14 of perforate material is supported by the arms 10, the bearing ring 9 and the ring 6, the said screen being of frusto-conical shape and having its lower small end held between the upper face of the bearing ring 9 and a lock nut 15, which is threaded on to a tube 16, passing through the nipple 12, the bearing ring 9, and supported in a manner to be described. The tube 16 has its ends threaded as indicated at 17, and is also provided with a threaded portion intermediate its ends for engagement by the lock nut 15.

The casing 2 has its lower end offset radially outward and externally threaded as indicated at 18, and the said end is received within the upper end of a casing 19. The casing 2 has a partition arranged at approximately a right angle to the axis of the casing 20, intermediate its ends, and an enlargement or cylinder 21 extends in both directions from the partition. The enlargement 21 has an opening at the axis of the casing 2, and the inner end of the tube 16 is threaded into the upper end of the opening. At its upper end the opening is enlarged twice, to form annular shoulders or valve seats 22 and 23, respectively, and ball valves 24 and 25 coöperate with the respective seats.

A disk 26 is arranged within the casing 2 at the outwardly offset lower end 18, and a stem or plunger 27 connected with the center of the disk extends upwardly through the opening of the solid portion 21 to a point near the lower ball 24. The lower end of the solid portion 21 is reduced and threaded externally and is engaged by a packing nut 28. A packing 29 is arranged between the nut and the end of the solid portion for packing the stem or plunger 27, and a coil spring 30 encircles the packing nut, bearing at one end against the disk and at the other against the partition and normally acting to press the disk downward.

A pin 31 is connected with the disk eccentrically and passes through an opening 32 in the packing nut to prevent angular movement of the disk and the plunger. The solid portion 21 is provided with a transverse passage 33 between the upper end of the plunger 27 and the adjacent ball 24, the said passage opening at one end into the interior of the body 1 and at the other into an eccentric passage in the solid portion, and consisting of three portions 34, 34ª and 34ᵇ. Annular shoulders or valve seats are formed between the intermediate and the end portions of the three, and ball valves 35 and 35ª coöperate with the seats. At its lower end the portion 34 of the passage communicates with a radial passage 36, and the outer end of this passage is closed by a threaded plug 37. A similar plug 38 closes the upper end of the portion 34ᵇ of the eccentric passage, the said plug having a polygonal head as shown for engagement by a wrench or the like to remove the plug.

A packing ring or gasket 39 is arranged between the lower end of the casing 2, and the casing 19, and the lower end of the casing 19 is closed by a cap 40, the said cap having a central depending internally threaded nipple 41. The inner end of the nipple is closed partially, and the interior of the nipple communicates with the interior of the cap by a series of inclined openings 42.

A disk 43 is arranged at the inner end of the nipple on the solid portion, and the nipple is provided with a central stem 44, which engages a central opening in the solid inner end of the nipple. A flexible diaphragm 45 is arranged between the cap 40 and the casing 19, the edge of the diaphragm being held between the lower end of the casing 19, and an annular shoulder 46 in the cap. The diaphragm is corrugated annularly between its center and its periphery as shown, and the central portion thereof is just above the disk 43.

A plate 47 is arranged above the diaphragm and between the same and an annular shoulder 48 in the lower end of the section 19. A shaft 49 is journaled transversely of the section 19 of the casing, and a cam wheel 50 is secured to the shaft intermediate the ends thereof. A ratchet wheel 51 is arranged on the shaft adjacent to the cam wheel, and a lever 52 is pivoted to the upper end of a supporting arm 53, held in the casing 19 at one side thereof by means of a set screw 54. The set screw is threaded through an opening in the wall of the casing 19, and into an opening in the arm.

A pawl arm 55 is pivoted to the lower end of the supporting arm 53, and a pawl 56 is pivoted intermediate its ends on the arm, one end of the pawl engaging the teeth of the ratchet wheel 51, and the other end is engaged by a coil spring 57 held in a recess in the pawl arm. The pawl arm is extended beyond the pawl to form a perforated lug 58, and a pin 59 passes through the perforation of the lug, the pin being held in a radial extension 60 in the casing 19.

A coil spring 61 encircles the pin between the lug 58 and a holding pawl 62. The holding pawl engages the teeth of the ratchet wheel to prevent reverse movement thereof, and the said pawl has an opening in the other end through which the pin 59 passes. The coil spring 61 normally holds the holding pawl against the upper end of the extension 60, and the said pawl is resilient.

The lever 52 has a lug 63 on its under side for engagement by the cam wheel 50, and the said lever has a rounded extension 63 on its upper side for engaging the under face of the disk 26. The radial passage 36 has a lateral opening 64, placing the said passage in communication with the interior of the body 1 of the container.

The shaft 49 is held in inwardly extending bearing bosses 65 from the casing 19, one of the said bosses engaging the outer face of the cam and the other the outer face of the ratchet wheel 51. The outer end of the shaft is squared as indicated at 66, in Fig. 2, for engagement by a crank or the like to turn the shaft.

The lubricator is designed to be connected by means of a pipe not shown, connected to the nipple 41, to one or both ends of a steam cylinder 70, gas engine or any other device of the character in question, and the lubricator is connected to the cavity or surface to be lubricated by means of a pipe not shown, engaging the upper end of the tube 16.

The lubricant is contained within the body 1 of the container, and the said lubricant may be of any desired character. The reservoir or container may be filled by lifting the bell-shaped or arched top or head 11, and the screen 14 is a strainer for insuring that the lubricant will be pure. At each change in pressure in the cylinder, the change will be transmitted to the interior of the cap by way of the passage 42 and the diaphragm 45 will be moved.

It is obvious that a piston could be substituted in place of the diaphragm if desired. The upward movement of the diaphragm moves the plate 47, and it will be noted that the pawl arm 55 is arched downwardly and engages the said plate in such manner that when the diaphragm 45 and the plate 47 are pushed upward, the pawl arm be lifted, and the pawl 56 will move the ratchet wheel 51. The holding pawl 62 will prevent reverse movement of the ratchet wheel and the shaft 49 will be partially rotated, the extent of rotation depending upon the extent of movement of the diaphragm 45.

Once during each complete rotation of the shaft 49, the cam wheel 50 through its engagement with the lug 63 of the lever 52 will lift the said lever. The lever 52 will be lifted as many times as there are points or projections on the cam 50. As conditions may require differently formed cams may be used, having two or more projections. Since the lug 63 of the said lever is in engagement with the under face of the disk 26, the said disk will be lifted against the resistance of the spring 30 and will move the plunger 27 upward. As soon as the lug 63 of the lever 52 has passed off of the highest portion of the cam 50, the lever will move downward and the spring 30 will force the disk 26 and the plunger 27 downward. It will be understood that a series of lifting movements of the diaphragm 45 will be required to rotate the shaft 49 a complete rotation, and for every complete rotation of the shaft the lever 52 is lifted and dropped as is also the disk 26 and the plunger 27. Whenever the plunger 27 moves downward a portion of the lubricant is drawn in through the opening 64, the radial passage 36 and the eccentric passage 34—34$^a$—34$^b$ by both of the ball valves 35 and 35$^a$ and by way of the passage 33 to the central opening of the solid portion 21. The upward movement of the plunger forces this lubricant past the ball valves 24 and 25 and into the tube 16. From the tube 16 the lubricant is supplied to the part to be lubricated. It will be obvious that the shaft 49, the cam wheel 50, the ratchet wheel 51, the pawl arm 55 and the pawl 56 together with the lever 52 might be eliminated, bringing the pressure through the openings 42 directly on the under face of the disk 26. That is, the lower end of the casing 2 might be engaged directly with the upper end of the cap 40, the diaphragm 45 remaining in the said lower portion.

By inserting the casing 19 and associated parts however, the lubricator may be operated manually by means of a crank. Any form of packing may be used in connection with the plunger 27. The essential feature of the invention is the mechanism contained in the casing 2, and consisting of the plunger, the disk 26, the spring, and the inlet and outlet ports together with the diaphragm 45 actuating the moving parts contained in the cap 40. By removing the plugs 37 and 38 the inlet passages may be drained or cleaned. The disk or button 43 acts as a stop for limiting the downward movement of the central portion of the diaphragm 45. The pin 31 by its engagement with the packing nut 28 permits the nut to be turned by turning the disk 26, thus dispensing with the necessity for withdrawing the plunger 27, in order to permit the nut to be turned.

The device as a whole, is compact, easily filled and cleaned and is positive in its action. The ball valves 24 and 25 prevent the return of the lubricant from the tube 16, and the ball valves 35 and 35$^a$ prevent the return of the lubricant to the interior of the holder. While the body 1 of the holder or container is shown of glass, it is obvious that it might be of metal if desired, or of any other suitable material. The plunger 27, the disk 26 and the packing nut 28 may all be turned, by pins inserted in openings 70, provided in the disk for this purpose when it is desired to tighten or loosen the packing nut or for any other reason. It will be understood that the diaphragm 45 is flexible, and that the form shown is shown for convenience only. The diaphragm may be plane or as arranged, or any other shape. The spring 57 is not necessarily a coil spring but may be a flat spring if desired. It will be understood that the lubricator may be used with any form of compressor or wherever it is desired to lubricate a moving member.

I claim:—

1. A lubricator comprising a container for the lubricant, a funnel-shaped screen seated within the upper end of the container, a concavo-convex head seated on the upper end of the funnel-shaped screen and with its convex surface upward, said head having a central opening and the screen having a central opening registering therewith, a pipe passing through the opening and adapted for connection at its outer end with the element to be lubricated, a casing connected to the lower end of the container and having a transverse partition and a cylinder extending on both sides of the partition, the bore of the cylinder being in alinement with the pipe, the lower end of the pipe being connected to the upper end of the cylinder, said cylinder having a plurality of check valves between the inlet end of the pipe and the outlet end of the bore thereof, a disk below the cylinder and having a plunger extending into the bore of the cylinder, said cylinder having a lateral inlet leading to the interior of the container and having a plurality of check valves, a spring arranged between the disk and the partition and normally pressing the disk downward, said last-named casing being adapted for connection with the cylinder of an engine and having an opening for placing the interior of the casing in communication with the interior of the cylinder, a third casing interposed between the second casing and the connection with the cylinder, a diaphragm arranged transversely of the said third casing and adapted to be acted upon by variations in pressure in the cylinder to move the diaphragm laterally, a shaft journaled transversely of the said third casing and provided at its outer end with means for permitting the shaft to be turned, a ratchet wheel secured to the shaft within the casing, a cam wheel secured to the shaft adjacent to the ratchet wheel, a pawl arm pivoted in the casing, a pawl pivoted to the pawl arm and engaging the ratchet wheel for moving the same when the arm is moved, said arm being adapted for engagement with the diaphragm to move the same to cause the pawl to advance the ratchet wheel, and means arranged between the cam and the disk for moving the disk when the cam is rotated.

2. A lubricator comprising a container for the lubricant, a funnel-shaped screen seated within the upper end of the container, a concavo-convex head seated on the upper end of the funnel-shaped screen and with its convex surface upward, said head having a central opening and the screen having a central opening registering therewith, a pipe passing through the opening and adapted for connection at its outer end with the element to be lubricated, a casing connected to the lower end of the container and having a transverse partition and a cylinder extending on both sides of the partition, the bore of the cylinder being in alinement with the pipe, the lower end of the pipe being connected to the upper end of the cylinder, said cylinder having a plurality of check valves between the inlet end of the pipe and the outlet end of the bore thereof, a disk below the cylinder and having a plunger extending into the bore of the cylinder, said cylinder having a lateral inlet leading to the interior of the container and having a plurality of check valves, a spring arranged between the disk and the partition and normally pressing the disk downward, said last-named casing being adapted for connection with the cylinder of an engine, and having an opening for placing the interior of the casing in communication with the interior of the cylinder, a third casing interposed between the second casing and the connection with the cylinder, a diaphragm arranged transversely of the said third casing and adapted to be acted upon by variations in pressure in the cylinder to move the diaphragm laterally, a shaft journaled transversely of the said third casing and provided at its outer end with means for permitting the shaft to be turned, a pawl and ratchet connection for advancing the shaft, and arranged to be operated by the diaphragm, and means arranged between the shaft and the disk for moving the disk when the shaft is rotated.

3. A lubricator comprising a container for a lubricant, a funnel-shaped screen seated within the upper end of the container, a concavo-convex head seated on the upper end of the funnel-shaped screen and with its convex surface upward, said head having a central opening and the screen having a central opening registering therewith a pipe passing through the opening and adapted for connection at its outer end with the element to be lubricated, a casing connected to the lower end of the container and having a transverse partition and a cylinder extending on both sides of the partition, the bore of the cylinder being in alinement with the pipe, the lower end of the pipe being connected to the upper end of the cylinder, said cylinder having a plurality of check valves between the inlet end of the pipe and the outlet end of the bore thereof, a disk below the cylinder and having a plunger extending into the bore of the cylinder, said cylinder having a lateral inlet leading to the interior of the container and having a plurality of check valves, a spring arranged between the disk and the partition and normally pressing the disk downwardly, said last-named casing being adapted for connection with the cylinder of an engine, and having an opening for placing the interior of the casing in communication with the interior of the cylinder.

4. A lubricator comprising a container for the lubricant, a casing connected to the lower end of the container and having a partition provided with a cylinder having its bore at the axis of the container, a pipe leading from the upper end of the cylinder to the surface to be lubricated, a plunger within the cylinder, a disk secured to the lower end of the plunger below the cylinder and movable toward and from the cylinder, a spring normally pressing the disk downward, said cylinder having a lateral inlet and having check valves at the inlet and between the cylinder and the pipe, the casing being adapted for connection with the cylinder of an engine, a flexible diaphragm arranged between the disk and the cylinder, a lever pivoted adjacent to the disk and engaging the disk at its free end, a cam for moving the lever, pawl and ratchet mechanism for moving the cam, an arm pivoted in the casing and carrying the pawl and engaging the diaphragm to be moved thereby when the diaphragm moves, and manually operated means for moving the cam.

5. A lubricator comprising a container for the lubricant, a casing connected to the lower end of the container and having a partition provided with a cylinder having its bore at the axis of the container, a pipe leading from the upper end of the cylinder to the surface to be lubricated, a plunger within the cylinder, a disk secured to the lower end of the plunger below the cylinder and movable toward and from the cylinder, a spring normally pressing the disk downward, said cylinder having a lateral inlet and having check valves at the inlet between the cylinder and the pipe, the casing being adapted for connection with the cylinder of an engine, a flexible diaphragm between the cylinder and the disk and arranged to be moved by variations in pressure in the cylinder, and means between the diaphragm and the disk and operated by the lateral movement of the diaphragm for moving the disk at predetermined intervals.

6. A lubricator comprising a container for lubricant, a casing connected with the container, a reciprocating pump in the casing for withdrawing lubricant from the container and delivering the lubricant away from the container, a flexible diaphragm arranged transversely of the casing, said casing having an opening on the opposite side of the diaphragm from the pump for connection with an engine, a lever for operating the pump, a shaft journaled in the casing between the pump and the diaphragm and having a cam for moving the lever to operate the pump, and pawl and ratchet mechanism arranged between the diaphragm of the shaft for rotating the shaft intermittently when the diaphragm is moved laterally by the steam pressure.

WILLIAM WALTER KNIGHT.

Witnesses:
   JOHN H. NUNNELLEY,
   JNO. L. DAVIS.